United States Patent [19]

Secher et al.

[11] Patent Number: 4,782,257
[45] Date of Patent: Nov. 1, 1988

[54] DUAL ROTOR MAGNET MACHINE

[75] Inventors: Bernard Secher, Toulouse; Roger Simon, Arnouville les Gonesses, both of France

[73] Assignee: Electromecanismes R.F.B., Societe Anonyme, Paris, France

[21] Appl. No.: 18,805

[22] Filed: Feb. 19, 1987

Related U.S. Application Data

[63] Continuation of Ser. No. 790,162, Oct. 22, 1985, abandoned.

[30] Foreign Application Priority Data

Oct. 22, 1984 [FR] France .................. 84 16110

[51] Int. Cl.$^4$ .......................................... H02K 16/02
[52] U.S. Cl. ..................... 310/114; 310/181
[58] Field of Search ............. 310/112, 114, 126, 178, 310/156; 322/46-51

[56] References Cited

U.S. PATENT DOCUMENTS

| 2,753,475 | 7/1956 | Curl | 310/126 X |
| 3,214,675 | 10/1965 | Foster | 322/46 |
| 3,535,572 | 10/1970 | De Rugeris | 310/114 X |
| 3,671,788 | 6/1972 | Knudson et al. | 310/156 |
| 3,713,015 | 1/1973 | Frister | 322/28 |
| 4,151,455 | 4/1979 | Jauotik | 322/48 |
| 4,472,673 | 9/1984 | Miller | 310/114 |
| 4,656,379 | 4/1987 | McCarty | 310/181 |

FOREIGN PATENT DOCUMENTS 2572229 4/1986 France .

OTHER PUBLICATIONS

Krug et al., "Electrical Correcting Elements in Automatic Control and Regulation Circuits", Pergamon, 1964, pp. 2 and 3.
Mailfert, "Machines à Réluctance Variable", Les Techniques de l'ingenieur", 1986, pp. 550-513 and 514.

Primary Examiner—Patrick R. Salce
Assistant Examiner—D. L. Rebsch
Attorney, Agent, or Firm—Laurence R. Brown; Alfred J. Mangels

[57] ABSTRACT

This alternator comprises an assembly of rotors (2), including a common shaft (3) on which are fixed a first rotor (4) having permanent magnets and a second, homopolar rotor (5), this assembly being disposed in a common stator whose power windings (7) surround the two rotors (4,5). An excitation coil (6) is disposed in confronting relation to the homopolar rotor and is supplied with direct current or alternating current as a function of the speed of rotation of the rotor assembly. In this way there is produced a magnetic flux which is added to that produced by the permanent magnets or is subtracted therefrom so as to maintain the output of the alternator constant.

9 Claims, 1 Drawing Sheet

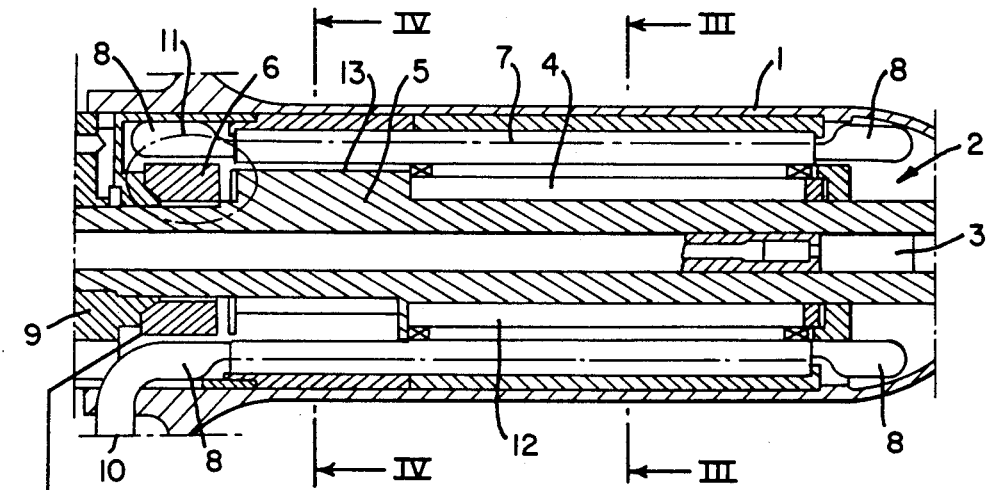
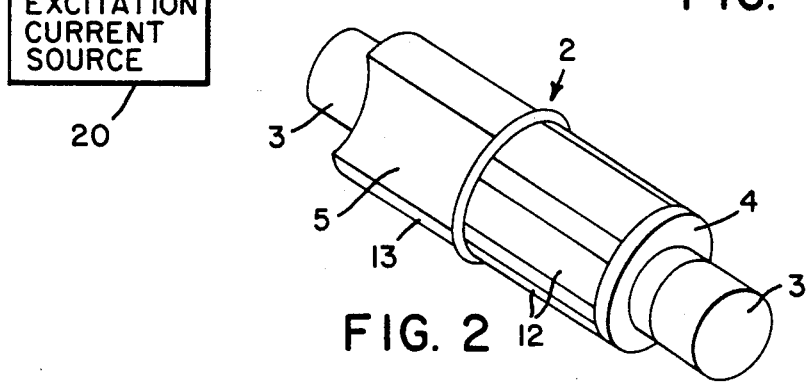
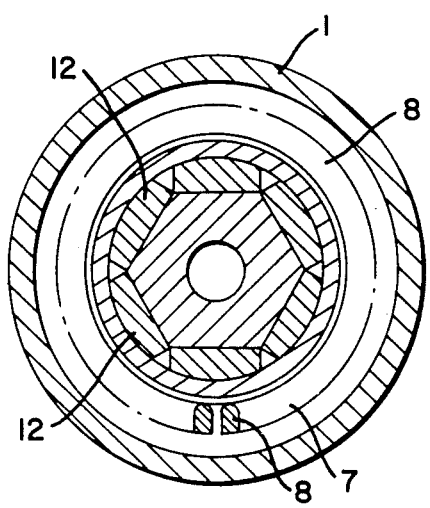
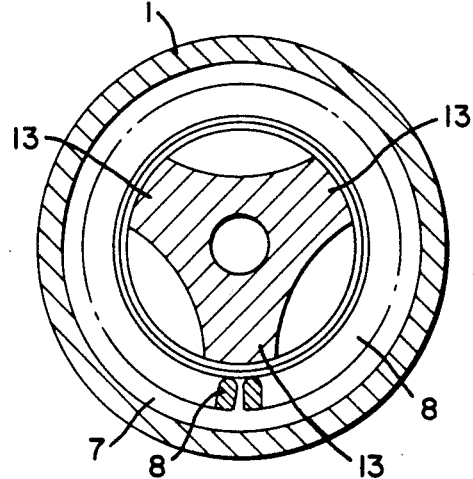
FIG. 1
FIG. 2
FIG. 3
FIG. 4

DUAL ROTOR MAGNET MACHINE

This application is a continuation of application Ser. No. 790,162, filed Oct. 22, 1985, now abandoned.

The present invention relates to rotating machines including magnets, such as generators or alternators, and for example concerns the regulation of the output voltage of the generators or alternators driven by driving machines. The invention more particularly relates to an alternator having incorporated regulating means. However, it also concerns motors such as synchronous motors with flux adaptation.

In many applications, an alternator is driven by a driving machine for supplying power to loads having an operation independent of that of said driving machine.

The speed of rotation of the driving machine is subject to multiple variations which result from the work required of the machine. These variations are in particular noticeable in the case of gas turbine motors.

It is moreover known that the constant flux output voltage of the alternator is directly related to the speed of the turbine and it is consequently necessary to provide means for maintaining the output voltage of the alternator supplying power to the loads constant.

For this purpose, U.S. Pat. No. 3,671,788 discloses an alternator comprising power and control windings for varying the magnetic flux and consequently the output voltage. The rotor and the stator of this alternator have a complicated and therefore expensive special structure including shunts having an L-shaped radial section assembled so as to form a U-shaped structure between the branches of which a control winding is disposed, while the power windings are disposed around the branches.

U.S. Pat. No. 3,713,015 discloses an alternator having an automatic voltage regulating device. This alternator comprises a rotor in two parts coaxially mounted on a common shaft, the relative positions of these parts being angularly adjustable by means of a control winding which thus varies the positions of the respective poles of these rotors so as to enable the output voltage of the alternator to be regulated.

These two different arrangements have several drawbacks among which are complicated circuits and/or mechanisms.

An object of the invention is to overcome these drawbacks by providing an alternator having an incorporated voltage regulating device which is simple and cheap to manufacture and is reliable in operation.

The invention therefore provides a rotating machine including magnets, for example a generator or an alternator, said machine comprising an assembly of rotors, including a common shaft on which are fixed a first rotor having permanent magnets, a second "homopolar" rotor, this assembly being disposed in a common stator including a power winding surrounding the two rotors, and at least one excitation coil disposed in confronting relation to the homopolar rotor and supplied with power as a function of the speed of rotation of the assembly of rotors and/or of the load of the machine.

It will be understood that, with this arrangement, a magnetic flux is generated whose direction may be reversed by reversing the direction of the current in the excitation coil, which permits, by means of this direction of circulation and of the value of this current, a variation of the homopolar flux, this flux being added to that generated by the magnets or being subtracted therefrom for regulating the machine.

According to another feature of the invention, there corresponds to every other magnet of the first rotor a tooth of the second rotor.

Further features and advantages of the invention will be apparent from the following description with reference to the accompanying drawing which is given solely by way of example and in which:

FIG. 1 is a longitudinal sectional view of an alternator according to the invention;

FIG. 2 is a perspective view of the assembly of the rotors of the alternator shown in FIG. 1;

FIG. 3 is a cross sectional view taken along line III—III of FIG. 1;

FIG. 4 is a cross sectional view taken along line IV—IV of FIG. 1.

With reference to the drawing and more particularly to FIG. 1, the alternator according to this invention comprises a stator housing 1 in which is rotatively mounted an assembly of rotors generally designated by the reference numeral 2.

The rotor assembly 2 comprises a rotary shaft 3 carrying a first rotor 4 of conventional type including permanent magnets, at the end of which is also mounted a second rotor 5 of a "homopolar" type having teeth.

The rotor assembly 2 is rotatively mounted by the ends of the shaft 3 in rolling bearings (not shown) inside the housing 1, which includes the power windings 7 fixed to the inner wall of the housing 1 and extending throughout the length of the first and second rotor.

The excitation coil 6 is mounted on a support member 9 connected to the stator 1 and supplied with a current from an excitation current source 20, which is preferably dc current which however may also be a modulated current.

The output voltage of the alternator appears on the conductors 10 adapted to be connected to loads supplied with power by the alternator.

It will be understood that, when the excitation coil 6 is supplied with dc current, it produces a magnetic flux 11 such as that shown in FIG. 1, which passes through the teeth of the homopolar rotor 5 and, if there is considered a section of the stator which covers the whole of the rotor, this section is traversed by the geometric sum of the flux of the magnets and the flux in the teeth of the homopolar rotor.

By means of the direction of circulation of the current in the excitation coil 6, the homopolar flux 11 may be either added to or subtracted from the flux produced by the magnets of the rotor 4. Thus it is possible to maintain the output voltage of the alternator constant by means of an electronic device of known type which controls the supply 20 of current to the excitation coil 6 in an appropriate manner, as a function of the speed at which the rotor and the load of the generator are driven.

In the illustrated embodiment, the rotor 4 including permanent magnets has six magnets 12 and the homopolar rotor 5 has three teeth 13, i.e. a tooth 13 of the homopolar rotor 5 corresponds to every other magnet 12. It will be understood that the rotor 4 may have any number of permanent magnets, the homopolar rotor having an appropriate number of teeth 13.

It will also be understood that the excitation coil may be supplied with ac current or a chopped current or its supply may be interrupted and re-established as a function of the fluctuations of the speed of the driving machine driving the alternator.

The alternator according to the invention is particularly advantageous in that it may be used in a direct drive connection with gas turbines or turbo-jet machines, but it may of course be also used with any other driving machine.

It must be understood that the alternator may be subjected to many modifications without departing from the scope of the invention defined in the claims. Thus, it may have a plurality of homopolar rotors, for example one at each end of the assembly of rotors, or a plurality of rotors including magnets 5, for example disposed on each side of a homopolar rotor, the excitation coils being each time mounted in the region of the corresponding homopolar rotor.

Further, the machine according to the invention may also be constructed in the form of a synchronous motor whose flux may be adapted to the desired operating point by sending a suitable excitation current, for example as a function of the load and/or the speed of the motor, in the homopolar excitation coil.

What is claimed is:

1. A rotary electrical generating machine including magnets and a power winding for supplying a magnetic flux pattern within a stator housing, said machine comprising, an assembly of a plurality of rotors fixed on a common shaft, said rotor assembly including at least a first rotor having a plurality of permanent magnets circumferentially disposed about the shaft and a second rotor defined by a solid rotor body having a plurality of longitudinally extending radial teeth, a common stator surrounding said first and second rotors including a common power winding surrounding each of said two rotors, and at least one excitation coil carried by the stator housing in confronting relation with a side of said second rotor to receive current as a function of the speed of rotation of said assembly of rotors for modifying the magnetic flux pattern within the stator housing to modify the speed of rotation of said rotor assembly in response to the current in said excitation coil.

2. An electrical generating machine as claimed in claim 1 wherein said excitation coil is constructed and positioned to receive varying current responsive to the speed of rotation of said common shaft.

3. A rotating machine including magnets and a power winding for supplying a magnetic flux pattern within a stator housing comprising an assembly of rotors including a common shaft on which is fixed a first rotor having permanent magnets and a second rotor defined by a solid rotor body having a plurality of longitudinally extending radial teeth, a common stator surrounding said assembly and including said power winding surrounding the two rotors, and at least one excitation coil disposed on the stator housing in confronting relation to the second rotor.

4. A rotating machine comprising:
 (a) a tubular housing having a longitudinal axis;
 (b) a rotor means rotatably carried in the housing, said rotor means including a rotatable shaft having an axis of rotation coincident with the longitudinal axis of the housing, a first rotor carried by said shaft and including a plurality of permanent magnets positioned circumferentially of the axis of rotation of the shaft, and a scond rotor carried by said shaft and adjacent said first rotor, said second rotor defined by a solid rotor element including a plurality of circumfernetialy spaced, longitudinally extending radial tooth means;
 (c) a stationary power winding carried by the housing and positioned radially outward of said rotor means;
 (d) excitation coil means carried by said housing for producing a magnet flux in the teeth of said second rotor; and
 (e) output conductor means connected with said power winding for conveying an output voltage induced in said power winding by rotation of said rotor means.

5. A rotating machine according to claim 4 wherein said first and second rotors are in fixed positional relationship relative to each other.

6. A rotating machine according to claim 4 wherein the number of teeth on said second rotor is one-half the number of magnets on said first rotor.

7. A rotating machine according to claim 4 wherein said coil means carries direct current.

8. A rotating machine according to claim 4 wherein said coil carries alternating current.

9. A rotating machine according to claim 4 wherein said power winding is a unitary winding assembly extending axially along and surrounding each of the rotors carried by said rotor means.

* * * * *